(No Model.)

J. GRANER.
MACHINE FOR CLEANING COTTON AND OTHER FIBERS.

No. 271,578. Patented Jan. 30, 1883.

WITNESSES:
F. H. Knight
F. C. Rose

INVENTOR
John Graner
per H. N. Jenkins
Attorney

UNITED STATES PATENT OFFICE.

JOHN GRANER, OF NEW ORLEANS, LOUISIANA, ASSIGNOR OF ONE-HALF TO HAMPTON SIDNEY SMITH, JR., OF SAME PLACE.

MACHINE FOR CLEANING COTTON AND OTHER FIBERS.

SPECIFICATION forming part of Letters Patent No. 271,578, dated January 30, 1883.

Application filed June 21, 1882. (No model.)

*To all whom it may concern:*

Be it known that I, JOHN GRANER, a resident of the city of New Orleans, parish of Orleans, and State of Louisiana, have invented a certain new and useful Improvement in Machines for Cleaning Cotton and other Fibers; and I do hereby declare the following to be a full, clear, and correct description of the same, reference being had to the annexed drawings, making a part of this specification.

My invention consists in a series of saws arranged obliquely on a shaft, the said saws held parallel with one another, and having their outer edges to travel on a line with the inner edges of those next thereto, in combination with a pair of feed-rollers and an intermediate feed-plate, one of the rollers having an elastic surface, so that the fibers may be tenaciously held while being operated upon.

Figure 1:
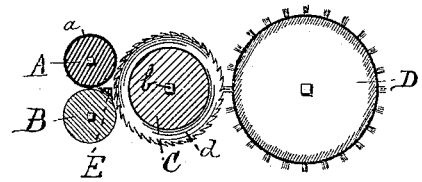
Figure 2:
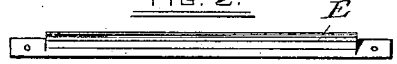
Figure 3:
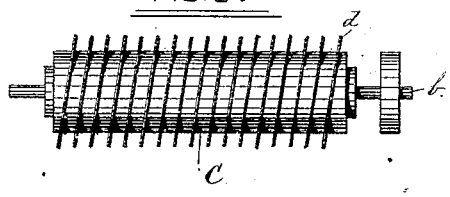

In the accompanying drawings, Figure 1 shows a section of my improvements and manner of arranging the same. Fig. 2 is a front view of my feed-plate, and Fig. 3 a front view of saw cylinder and shaft with saws arranged obliquely thereon.

On the drawings but one pair of feed-rollers, A B, are shown. Others, however, may be arranged in front of these, should the material operated on render the same necessary. For cotton-gins one pair of feed-rollers is all that is required. One of these feed-rollers, A, should be made of gum or the rolling surface of the same should be covered with an elastic or yielding material, as shown at *a*. Immediately behind these rollers is journaled the shaft *b* of the saw-cylinder C, the latter having its saws *d* secured thereon in an oblique manner, so that when held in the position shown in Fig. 3 the upper teeth of one saw shall be on a line with the lower teeth of the saw next thereto. D is the brush-cylinder.

The letter E designates the feed-plate, which is fitted with flat side uppermost between the feed-rollers and saws, as shown in Fig. 1, so that the fiber may pass over the same and be drawn down over one edge thereof by the saws, the teeth of which operate in close proximity thereto. In this arrangement there is less liability of dirt and trash passing between the saws than there would be if the saws were set at the ordinary angle. Besides, the fibers are more thoroughly separated, and hence better and more rapid results are obtained.

From the above description it will be seen that in the operation of my invention its action is more like that of a cotton-gin than of a beater, inasmuch as the fibers are separated and drawn forward by the teeth of the saws, from which they are released by a revolving brush, (see Fig. 1,) as in ordinary cotton-gins.

Having described my invention, what I claim as new, and desire to secure by Letters Patent, is—

In a machine for cleaning cotton and other fibers, a series of saws arranged obliquely on a shaft, in combination with the feed-rollers A B, and feed-plate E, for the purpose specified.

In testimony whereof I hereunto sign my name.

JOHN GRANER.

In presence of—
C. J. REID,
JNO. JORDAN.